US008686054B2

(12) United States Patent
Elabd et al.

(10) Patent No.: US 8,686,054 B2
(45) Date of Patent: *Apr. 1, 2014

(54) FILLED NANOPOROUS POLYMER MEMBRANE COMPOSITES FOR PROTECTIVE CLOTHING AND METHODS FOR MAKING THEM (75) Inventors: Yossef A. Elabd, Philadelphia, PA (US); Giuseppe R. Palmese, Hainsport, NJ (US)

(73) Assignee: Drexel University, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,552

(22) Filed: Apr. 10, 2012

(65) Prior Publication Data
US 2014/0031439 A1   Jan. 30, 2014

Related U.S. Application Data (63) Continuation of application No. 12/301,176, filed as application No. PCT/US2007/069658 on May 24, 2007, now Pat. No. 8,173,713.

(60) Provisional application No. 60/803,194, filed on May 25, 2006.

(51) Int. Cl.
*B01J 49/00* (2006.01)

(52) U.S. Cl.
USPC ............... 521/27; 521/30; 521/31; 521/32; 521/33; 521/35; 521/36; 521/37; 521/38; 521/39

(58) Field of Classification Search
USPC .......... 521/27, 30, 31, 32, 33, 34, 35, 36, 37, 521/38, 39
See application file for complete search history.

(56) References Cited

U.S. PATENT DOCUMENTS

| | | | |
|---|---|---|---|
| 4,039,440 | A | 8/1977 | Cadotte |
| 4,194,041 | A | 3/1980 | Gore et al. |
| 4,469,744 | A | 9/1984 | Grot et al. |
| 4,486,376 | A | 12/1984 | Makino et al. |
| 4,510,193 | A | 4/1985 | Blucher et al. |
| 4,515,761 | A | 5/1985 | Plotzker |
| 4,518,650 | A | 5/1985 | Grot et al. |
| 4,943,475 | A | 7/1990 | Baker et al. |
| 5,024,594 | A | 6/1991 | Athayde et al. |
| 5,260,360 | A | 11/1993 | Mronzinski et al. |
| 5,273,814 | A | 12/1993 | Kelly |
| 5,743,775 | A | 4/1998 | Baurmeister |
| 6,187,696 | B1 | 2/2001 | Lim et al. |
| 6,395,383 | B1 | 5/2002 | Maples |
| 6,689,501 | B2 | 2/2004 | Stone et al. |
| 8,173,713 | B2 * | 5/2012 | Elabd et al. ............ 521/27 |
| 2005/0147757 | A1 | 7/2005 | Roh et al. |

FOREIGN PATENT DOCUMENTS

WO        2004009684  A1    1/2004

OTHER PUBLICATIONS

Elabd, et al., "Diffusion of Acetonitrile in Conformational Isomers of an H12MDI Polyurethane", Polymer, vol. 41, pp. 2203-2212, 2000.
Elabd, et al., "Separating Solvation from Molecular Diffusion in Polymers", AIChE Journal, vol. 46, No. 6, pp. 1255-1261, Jun. 2001.
Elabd, et al., "Acetic Acid Diffusion in Polyisobutylene: Probing Small Molecule Structures", Ind. Eng. Chem. Res, 40, pp. 3076-3084, 2001.
Elabd, et al., "Effect of Penetrant-Polymer Interactions on Molecular Diffusion in Conformational Isomers of Heterogeneous Polymer", Macromolecules, 34, pp. 6268-6273, 2001.
Elabd, et al., "Multicomponent Diffusion of Hydrogen-Bonding Solutes in a Polymer", AIChE Journal, vol. 48, No. 8, pp. 1610-1620, Aug. 2002.
Elabd, et al., "Triblock Copolymer Ionomer Membranes Part I. Methanol and Proton Transport", Journal of Membrane Science, No. 217, pp. 227-242, 2003.
Robinette, E. Jason & Palmese, Giuseppe R., "Radiation Grafting onto Electrospun Fibers", Department of Chemical engineering, Drexel University, 32nd and Chestnut Streets, Philadelphia, PA 19104, 2 pages.
Elabd, et al., "Triblock Copolymer Ionomer Membranes Part II. Structure Characterization and its Effects on Transport Properties and Direct Methanol Fuel Cell Performance", Journal of membrane Science, 231, pp. 181-188, 2004.
Elabd, et al., "Time-Resolved Fourier Transform Infrared/Attenuated Total Reflection Spectroscopy for the Measurement of Molecular Diffusion in Polymers", Journal of Polymer Science, Part B, Polymer Physics, vol. 41, pp. 2794-2807, 2003.

* cited by examiner

*Primary Examiner* — Edward Cain
(74) *Attorney, Agent, or Firm* — Mendelsohn, Drucker & Dunleavy, P.C.

(57) ABSTRACT

A new class of membranes for use in protective clothing. More specifically, the present invention relates to a polymer-polymer membrane with an ionic polymer located within the nanopores of a porous polymer host membrane. A method for making the polymer-polymer membranes involves filling porous polymers with ionic polymers. The porous polymers may be fabricated by a template synthesis which involves sorption. The ionic polymers may be filled in the nanopores of the porous polymer by plasma-induced graft copolymerization of the ionic polymer with the porous polymeric host membrane.

21 Claims, 7 Drawing Sheets

FILLED NANOPOROUS POLYMER MEMBRANE COMPOSITES FOR PROTECTIVE CLOTHING AND METHODS FOR MAKING THEM

CROSS-REFERENCE TO RELATED APPLICATIONS

This application is a continuation of U.S. patent application Ser. No. 12/301,176, filed on Nov. 17, 2008, which, in turn, is a 371 continuation of International application no. PCT/US07/069,658, filed on May 24, 2007, which, in turn, is a non-provisional of U.S. provisional application No. 60/803,194, filed on May 25, 2006.

STATEMENT OF GOVERNMENT INTEREST

This invention was made with Government support under Contract No. W911NF0510036 awarded by the Army Research Office; the Government has certain rights in the invention.

BACKGROUND OF THE INVENTION

1. Field of the Invention

The invention relates to a new class of membrane, for use in protective clothing and to methods of making such membranes. More specifically, the present invention relates to a polymer-polymer membrane with an ionic polymer within the nanopores of a porous polymer host membrane and to methods for making such membranes.

2. Description of the Related Technology

Chemical protective clothing (CPC), which is manufactured for purposes, such as the cleanup of chemical spills, was suggested for applications in homeland defense (Arca et al., 1999). The materials used in these suits (e.g., Tychem® (DuPont), Tyvek® (DuPont), Barricade® (Dupont), 4H® (Safety 4, Inc.), Chemrel® (Chemron UK), Nomex® (Dupont), Responder® (Life-Guard), Saranex® (Dow), Trellchem® (Trelleborg Protective Products AB)) provide good barrier properties for most chemicals. However, they are also good barriers for water vapor (i.e., perspiration), and therefore, are usually referred to as first-responder suits when applied to homeland defense applications since their water-permeability characteristics make them impractical for extended use or wear periods.

Butyl rubber has also been used for protective clothing and may still be found in gloves and boots. Butyl rubber is an effective barrier to most harmful agents at certain thicknesses. However, similar to CPC, butyl rubber is also a barrier to water vapor. Wearing garments manufactured from this material in combat or other situations that involved physical activity is not practical, since the lack of breathability causes tremendous heat fatigue and exhaustion.

A more recent approach taken by the military has focused on using protective suits, such as MOPP (Military Oriented Protective Posture) and JSLIST (Joint Service Lightweight Integrated Suit Technology), which use sorption materials to absorb chemical/biological agents. More specifically, this technology is based on absorbing harmful agents with activated carbon fillers. JSLIST is more breathable than butyl rubber, but does not provide as much protection from chemical/biological agents and is still heavy and bulky, which limits working in these suits to about 45 minutes per hour. In addition, suits based on this sorption principle have a limited overall lifetime.

A variety of selective polymer membranes have also been proposed for this application. Exemplary patents are U.S. Pat. No. 5,024,594 (Athayde et al.); U.S. Pat. No. 4,943,475 (Baker et al.); U.S. Pat. No. 5,743,775 (Baurmeister); U.S. Pat. No. 4,039,440 (Cadotte); U.S. Pat. No. 4,194,041 (Gore et al.); U.S. Pat. No. 4,518,650 (Grot et al.); U.S. Pat. No. 4,469,744 (Grot et al.); U.S. Pat. No. 6,187,696 (Lim et al.); U.S. Pat. No. 6,395,383 (Maples); U.S. Pat. No. 5,260,360 (Mrozinski et al.); U.S. Pat. No. 4,515,761 (Plotzker); U.S. Pat. No. 5,740,551 (Walker); U.S. Pat. No. 5,824,405 (White); and U.S. Pat. No. 5,391,426 (Wu). However, no single technology has emerged that satisfies the necessary technical requirements of being chemically selective, flexible, durable, water-permeable and cost-effective.

U.S. Pat. Nos. 5,928,804 and 6,375,885 describe the sorption of Nafion® onto collinear cylindrical pores of neutron track etched polycarbonate (PC) membranes.

U.S. Pat. No. 6,402,958 describes composite membranes with an ion-conducting polymer embedded within a porous substrate. The porous substrate comprises randomly oriented fibers. Ion-conducting polymers include Nafion® (perfluorosulfonic acid polymers), styrene-(ethylenebutylene)-styrene as well as other styrene components that may be functionalized with sulphonate, phosphoric or phosphonic groups.

U.S. Pat. No. 6,689,501 describes a composite membrane comprising a porous polymeric substrate such as expanded polytetrafluorethylene and an impregnant comprising an ion exchange material. The impregnant may include perfluorosulfonic acid polymers (e.g. Nafion®) or fluorostyrenic polymers such as alpha-fluorostyrene.

Preferably, chemical/biological protective clothing for everyday use should be protective, breathable (i.e. water-permeable), lightweight, flexible, durable, robust, launderable, cost-effective, and processable (i.e., easily integrated with a fabric/textiles)

Accordingly, there is a need in the art for improved materials for use in protective clothing. There is also a need in the art for suitable methods for fabricating improved protective clothing.

SUMMARY OF THE INVENTION

Accordingly, it is an object of certain embodiments of the invention to provide a new class of membranes for use in protective clothing. More specifically, the present invention relates to a polymer-polymer membrane with an ionic polymer located within the nanopores of a porous polymer host membrane which may be used in protective clothing.

In a second aspect, the present invention relates to a method for making the polymer-polymer membranes of the present invention. In this method, nanoporous polymers are filled with ionic polymers. The nanoporous polymers may be fabricated by a template synthesis which involves sorption. The ionic polymers may be located in the nanopores of the porous polymer by plasma-induced graft copolymerization of the ionic polymer with the porous polymer.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 3a1, 3a2, 3b1, 3b2, 3c1 and 3c2 show scanning electron micrograph images of (a) original polyester track-etched membrane (PETE), (b) PAMPS grafted in PETE (PAMPS-g-PETE) without cross-linker (9.3 wt % grafting), and (c) PAMPS-g-PETE with 2 wt % cross-linker (25.4 wt % grafting), of Example 1. The views labeled "1" are surface views and the views labeled "2" are cross-sectional views.

FIGS. 9(a)-9(b) are Energy dispersive spectra of the cross-section of: FIG. 9(a) PCTE2000 with tubular PAMPS domains, and FIG. 9(b) PCTE2000 with fibril (cross-linked) PAMPS domains.

DETAILED DESCRIPTION OF THE PREFERRED EMBODIMENTS

The present invention relates to a polymer-polymer membrane with an ionic polymer located within the nanopores of a porous polymer host membrane. The ionic polymer may be in the form of a gel, but may be in any other suitable form as well. In one embodiment, the ionic polymer is hydrophilic and the porous polymer is hydrophobic.

The host polymer membrane provides a mechanically strong, durable, flexible barrier, while the ionic polymer within the nanopores of the host polymer membrane may provide a high water permeability (breathable), selectivity (breathable barrier) and, stimuli-responsive traits for size-exclusion of toxic chemicals (absolute barrier under extreme conditions).

The pore size of the filled polymer membrane matrix can be varied by application of an electric field. Using this electrokinetic phenomenon, a polyelectrolyic membrane can act as an electrically activated "chemical valve" or "permeability valve" to regulate transport of specific chemicals through the membrane.

The focus of this invention is for protective clothing applications, though other uses may also be made of the materials described herein. The protective clothing can be provided with a device or means for applying an electric field to the membrane, if desired, in order to activate the membrane and alter the pore size, when desired to modify the permeability or other properties of the membrane.

Chemical and biological defense requires protective clothing that is both breathable (to provide comfort and reduce heat stress) and an absolute barrier to harmful agents (i.e., highly selective membranes).

Ionic polymers, and particularly ionic polymer gels have a high permeability to water, a high selectivity for water over organics, and can contract and expand in response to an electrical stimulus. However, ionic polymer gels are not mechanically stable and thus are not, taken alone, suitable for use to fabricate protective clothing. The present invention provides a new class of membranes based on polymer-polymer composites of ionic polymers located within the nanopores of a polymer host matrix. The host matrix provides a mechanically strong, durable, flexible barrier, while the ionic polymer provides a highly water permeable (breathable) membrane with stimuli-responsive traits for size-exclusion of toxic chemicals.

Figure 1:
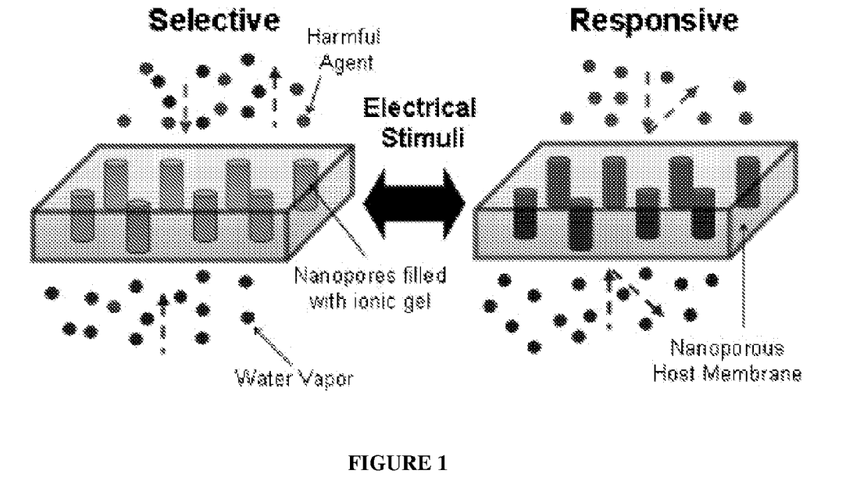
FIG. 1 shows a schematic representation of the polymer-polymer composite material in accordance with the present invention.

A schematic representation of the polymer-polymer composite material is given in FIG. 1. As can be seen in FIG. 1, a polymeric host membrane forms the mechanically stable, yet flexible, portion of the material. The host membrane is porous and the nanopores of the host membrane are filled with an ionic polymer gel. Preferably, the host membrane is hydrophobic and the ionic gel in the nanopores of the host membrane is hydrophilic. In one embodiment, the host membrane is a hydrophobic polymer-polymer nanocomposite wherein the host membrane contains nanopores filled with hydrophilic ionic polymer gel. Examples of suitable host membrane polymers include, but are not limited to, polyester track-etched membranes (PETE), polyamides such as Nylon®, polysulfone, polyethylene, polyester, polyisobutylene, polytetrafluoroethylene, polyolefins such as Nurcrel®, ionomers such as Surlyn®, and fluoropolymers such as Viton®.

Pore diameters may range from 0.1 nm to 2000 nm Pore diameters may also range from 1 nm to 1000 nm In one embodiment, pore diameters range from 1 nm to 200 nm. In another embodiment, pore diameters range from 1 nm to 100 nm. The number of pores per unit area can be selected to achieve the desired vapor permeability by adjusting the manufacturing process, as demonstrated in the examples given below. The porosity of the host membrane may vary between 0.01 and 25%, or between 0.05 and 15%.

The host membrane material may be a nanocomposite membrane with oriented polyelectrolyte nanodomains therein which are normal or substantially normal to the plane of the membrane. Nanodomains which are substantially normal to the plane of the membrane better regulate permeability of the membrane in the desired direction when an electric field is applied thereto.

The ionic gel may, in one embodiment, be water-permeable to allow water vapor to be transmitted across the membrane via the ionic gel in the nanopores of the host membrane. The ionic gel is also selective such that it prevents transmission of at least some harmful agents across the membrane as shown on the left side of FIG. 1. A co-continuous morphology is provides good transport across the membrane in the ionic phase.

In one embodiment, the ionic gel may be selected such that it contracts and expands within the nanopores of the host membrane in response to the application of electrical stimuli. This embodiment provides a tunable permeability of the ionic gel in the nanopores of the host membrane. This permits the membrane to be set for, for example, maximum water permeability in non-threat situations, and reduced harmful agent permeability in situations where a threat is imminent. In this manner, the burden of the protective clothing on the user can be reduced when in situations where reduced harmful agent permeability is not required, without requiring the user to remove the protective clothing entirely and while still providing some protection against harmful agents. Examples of suitable ionic polymers include, but are not limited to, poly (2-acrylamido-2-methyl propane sulfonic acid) (PAMPS), vinyl ester-co-poly(2-acrylamido-2-methyl propane sulfonic acid) (PAMPS), diphenylmethane-4,4'-bismaleimide (BMI)-co-PAMPS, poly(methylacrylic acid) (PMAA), poly(acrylic acid) (PAA), and chitosan.

The ionic polymers may be in the form of fibers or tubes, for example. The form of the ionic polymer may effect properties such as proton conductivity and specific conductivity of the membranes, thereby providing another method for tuning the properties of the membrane.

Figure 2:
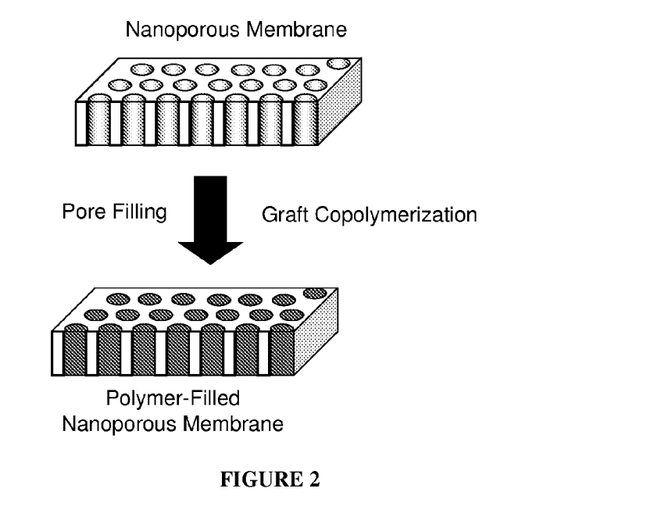
FIG. 2 shows a schematic representation of a first method for making a polymer-polymer composite in accordance with the present invention by filling the nanopores of a host membrane with ionic gel.

One method for creating polymer-polymer nanocomposites in accordance with the present invention is to provide nanoporous polymers that are subsequently filled with ionic polymer gels. This concept is shown schematically in FIG. 2a. Template synthesis of selective and responsive nanopore-filled polymers consists of filling porous polymer structures with ionic polymer gels.

The ionic polymers may be covalently bound to the host polymer. One suitable method for covalently binding the ionic polymers to the host membrane is graft copolymerization. Optionally, the ionic polymers may also be cross-linked to provide certain desired properties of the membrane.

Two exemplary types of porous polymeric templates are randomly oriented amorphous nanoporous membranes and track-etched polymer membranes. Template synthesis may include sorption and plasma-induced graft copolymerization of the ionic gel within the nanopores of the host membrane. Track-etched polymer membranes which have straight, cylindrical pores that are oriented normal or substantially normal to the plane of the membrane, can be used to provide membranes with high aspect ratios oriented in the desired direction to thereby offer control and customizability of transport across the membrane. In addition, the transport properties of these membranes can be tailored by the choice of ionic polymer filler located in the nanopores, the pore size of the membrane and the porosity of the membrane.

In one embodiment, the host membrane is pre-treated with an oxygen plasma treatment to functionalize the polymer surface with oxygen-containing groups. These groups are thermally labile in nature and, upon heating, initiate graft copolymerization of the host membrane with the ionic polymer to allow formation of graft layers of ionic polymer on the surface of the host membrane. The oxygen-containing groups can also be used to introduce hydrophilicity into the hydrophobic host membrane. This facilitates filling of the nanopores of the host membrane using an aqueous reaction solution.

The concentration of oxygen-containing groups in the host membrane can be increased by increasing the exposure time to the oxygen plasma during the oxygen plasma treatment step. The grafting yield of the ionic polymer to the host membrane can be customized by selecting the concentration of oxygen-containing groups in the host membrane, thereby providing an additional methodology for customizing the transport properties of the membrane.

A bi-functional cross-linker may also be employed to enhance the grafting yield of the ionic polymer on the host membrane. Higher concentrations of bi-functional cross-liners, such as N,N'-methylenbis(acrylamide), will result in a higher concentration of pendant double bonds available for initiations, thereby increasing the grafting yield.

Grafting yields may be anywhere from 1-35%, 5-30%, or, alternatively 15-30%. These yields correspond to the weight percentage of the ionic polymer, relative to the total weight of the grafted membrane including both the ionic polymer and host membrane.

The hydrophobic polymer membrane provides strength, flexibility, durability, and barrier properties, while the hydrophilic ionic gel provides selectivity and responsiveness. As pore size is reduced to nanoscale there is a significant improvement in transport properties and selectivity, as evidenced by the examples given below.

The concept of fabricating a membrane by template synthesis via filling a nanoporous membrane with another polymer of dissimilar properties provides major advantages in the fabrication of materials suitable for use in protective clothing. Moreover, plasma-induced graft copolymerization successfully fills the hydrophobic nanoporous membranes with hydrophilic polymer, despite the lack of affinity between these materials. The examples given below demonstrate substantially complete filling of the membrane and the production of a membrane that is breathable, selective, flexible, and durable.

The concept of fabricating a membrane by encapsulating polymer nanofibers with another polymer of dissimilar properties also provides advantages in the fabrication of materials suitable for use in protective clothing.

The examples given below demonstrate:

Graft copolymerization of PAMPS onto nanoporous polyester membranes.

Transport of relevant species across the membrane via ion conductivity (stimuli-responsiveness), water vapor permeability (breathability), and dimethyl methyl phosphonate (DMMP) permeability (protectiveness). DMMP simulates the nerve agent Sarin®.

Synthesized membranes are about 10 times more selective than the JSLIST material which forms the basis for the current military standard used in chemical/biological protective clothing, with a similar water vapor transmission rate.

EXAMPLES

Example 1A

Nanoporous Graft Copolymers: PETE-g-PAMPS, PETE-g-PMAA, and Nylon®-g-PMAA

In this example, both PAMPS and poly(methylacrylic acid) (PMAA) were graft copolymerized onto the pore walls of nanoporous polyester track-etched membranes (PETE) and nanoporous Nylon® using an oxygen plasma treatment.
PETE-g-PAMPS This part of the example demonstrates the ability to graft copolymerize a polyelectrolyte (ionic polymer) onto the pore walls of a nanoporous host polymer in which the amount of polyelectrolyte is controlled by monomer concentration and reaction conditions. Grafting is a useful technique for modifying polymer surface properties to construct materials whose bulk and surface properties are different.

Figure 3:
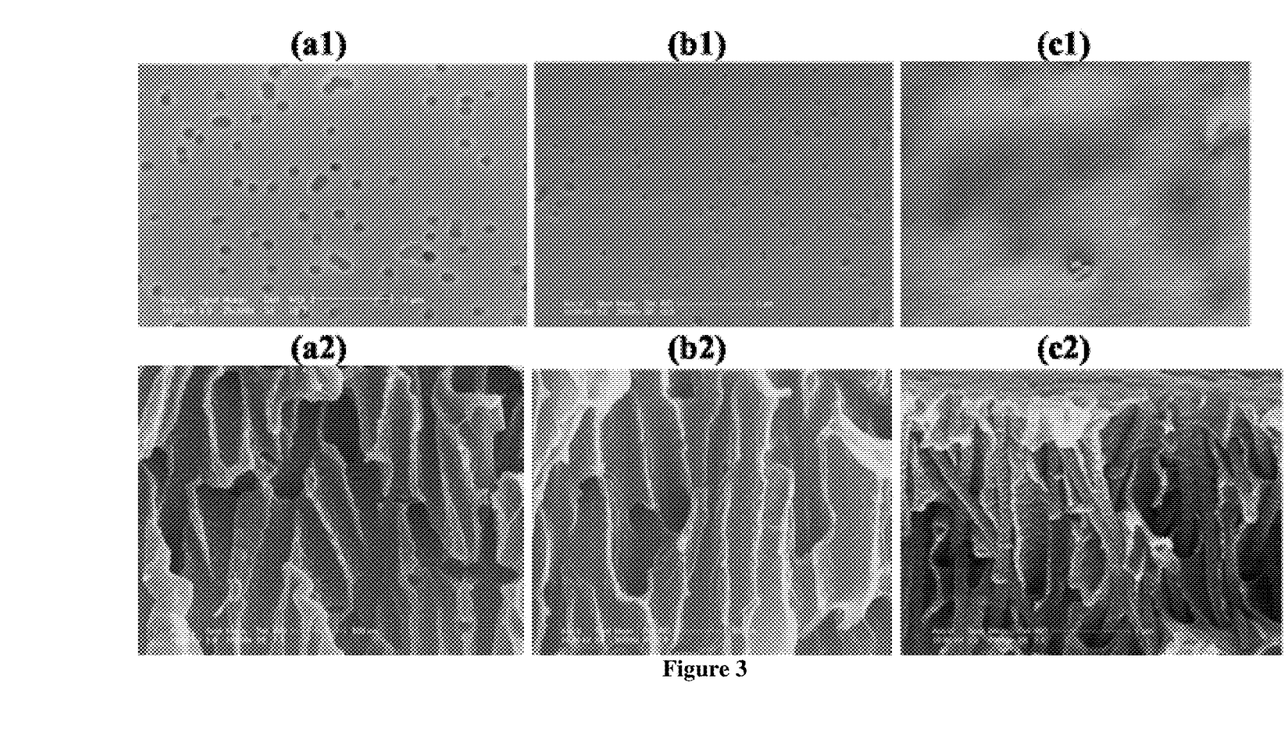

FIG. 3 shows SEM images of a nanoporous polymer (track-etched polyester (PETE)) before and after grafting poly(2-acrylamido-2-methyl-1-propanesulfonic acid) (AMPS) onto the surface of the pore walls. PAMPS contains ionic groups (e.g. sulfonic acid groups) similar to that of Nafion®, which has been used in fuel cells. The nanoporous membrane used in this study is a track-etched membrane. Unlike nanoporous polymers obtained by solvent extraction techniques, nanoporous track-etched polymer membranes have straight cylindrical nanopores that are oriented normal to the plane of the membrane, as shown in FIG. 3a.

Track-etching consists of bombarding a polymer membrane with heavy energetic ions to create damage tracks followed by a chemical etching of tracks into pores. The resulting membrane contains randomly distributed pores of uniform pore diameter in a range of 2000 nm to 10 nm (100 nm pore diameters are shown in FIG. 3), with low pore densities. Graft copolymerization of PETE consisted of an oxygen plasma treatment followed by a thermally initiated graft copolymerization of AMPS onto the pore wall surface.

Oxygen plasma treatment functionalizes the polymer surface with oxygen-containing groups, such as hydroxyl, carbonyl, and hydroperoxide groups. The hydroperoxide groups are thermally labile in nature and initiate the graft polymerization of AMPS to introduce graft brush layers onto the surface. The amount of graft was controlled by the reaction conditions. Higher grafting ratios were obtained with increasing AMPS concentration, reaction time, and cross-linker concentration as shown in Table 1.

TABLE 1

Synthesis[a] of Polyelectroltye-Polymer Nanocomposite Membranes

| AMPS Conc. (wt %) | BisA Conc. (wt %) | Reaction Time (hr) | Grafting Ratio (wt %) |
|---|---|---|---|
| PETE Original Membrane | | | |
| 10 | 0 | 4 | 0 |
| 20 | 0 | 4 | 3.7 |
| 40 | 0 | 1 | 6.4 |
| 40 | 0 | 4 | 9.3 |
| 20 | 0.2 | 3 | 12.9 |
| 20 | 0.4 | 3 | 25.4 |

[a]120-sec plasma exposure time, 50° C. polymerization temperature

FIG. 3 visually confirms grafting, where the original PETE membrane is characterized by a flat and smooth surface (FIG. 3a1) and uniform cylindrical pores (~100 nm in diameter) randomly oriented normal to the plane of the membrane (FIG. 3a2). With 9.3 wt % of PAMPS grafts, the pores on the top surface of the membrane became partially closed (FIG. 3b1). The pore walls of the original PETE membrane were rough as a result of the etching process in the manufacturing of track-etched membranes (FIG. 3a2). After grafting, a smoother layer was observed, showing that PAMPS grafts on the pore walls (FIG. 3b2).

Table 2 lists the measured conductivities of PAMPS-g-PCTE (track-etched polycarbonate) at pore sizes and porosities ranging from 10 nm to 2 μm and 0.05-15%, respectively.

TABLE 2

Conductivity of Polyelectrolyte-Polymer Nanocomposite Membranes

| Membrane | Pore Size (μm) | Porosity (%) | Proton Conductivity (S/cm) (×$10^{-3}$) | Normalized Conductivity (S/cm) (×$10^{-3}$) |
|---|---|---|---|---|
| PCTE | 0.01 | 0.05 | 0.00209 | na |
| PAMPS[a] | na | Na | 21.6 | na |
| PAMPS-g-PCTE | 0.01 | 0.05 | 0.0385 | 76.9 |
| PAMPS-g-PCTE | 0.05 | 1.18 | 0.781 | 66.2 |
| PAMPS-g-PCTE | 0.1 | 3.14 | 1.48 | 47.1 |
| PAMPS-g-PCTE | 0.4 | 12.56 | 3.97 | 37.6 |
| PAMPS-g-PCTE | 0.8 | 15.07 | 1.82 | 12.1 |
| PAMPS-g-PCTE | 2.0 | 6.28 | 0.701 | 11.2 |

[a]5 wt % crosslinker

Figure 4:
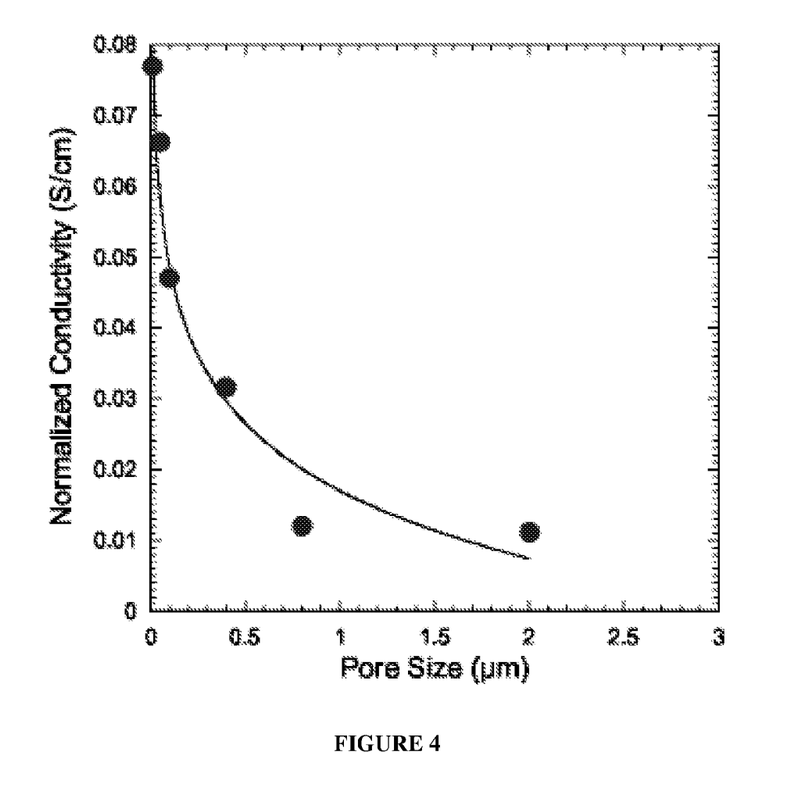
FIG. 4 shows the normalized proton conductivity versus pore size for PAMPS-g-PCTE membranes of Example 1.

The conductivity of the PCTE membrane increased by four orders of magnitude after grafting. This demonstrates the ability to develop a new class of ion conductive polymer with both high ionic conductivity and strength. When conductivity is normalized by the membrane porosity, the conductivity increased exponentially with decreasing pore size with the highest normalized conductivity three times higher than the PAMPS gel, as shown in FIG. 4. Furthermore, the normalized conductivity reaches values higher than the PAMPS gel at pore sizes <400 nm. This suggests that smaller pores may increase response times for stimuli-responsive traits.

Example 1B

Grafting concentration can be increased further with the aid of a crosslinker, N,N'-methylenebisacrylamide (BisA), (25.4 wt %) grafts) resulting in the top surface completely covering the pores with a layer of PAMPS (FIG. 3c1) and the pores being completely filled with PAMPS rods (FIG. 3c2). The grafting of PAMPS on the surface and in the pores was also confirmed by elemental analysis and FTIR-ATR spectroscopy. This example demonstrates the ability to functionalize the surface and pore walls of nanoporous polymers to produced polyelectrolyte-polymer nanocomposite membranes.

The transport properties of dimethyl methylphosphonate (DMMP) (99%, Aldrich), a simulant of the nerve agent Sarin, in the PETE and nanocomposite membranes were measured using a side-by-side glass diffusion cell equipped with a thermal jacket. Membranes were prehydrated in ultra-pure, deionized, reverse osmosis water (resistivity of about 16 MΩ cm) for at least 48 hours. The donor compartment was charged with 10 volume percent of DMMP aqueous solution, while the receptor compartment was filled with water. The membrane, which was sandwiched by two pieces of porous carbon cloth (electrodes), was clamped between the two compartments. The electrodes were connected to a DC power supply using platinum wire. The concentration of DMMP that permeates through the membrane was measured continuously as a function of time on the receptor side with a real-time in-line Fourier transform infrared, attenuated total reflectance (FTIR-ATR) (Nocolet™ 6700 Series; Specac Inc.) spectrometer for detection. Infrared spectra were continuously recorded throughout each experiment at 12 second intervals using 32 scans and 4 $cm^{-1}$ resolution for each collected spectrum. In all experiments, both the side-by-side diffusion cell and ATR cell were temperature controlled (35° C.) with the same circulating water bath (Neslab™ RTE10, Thermo Electron Co.).

Figure 6:
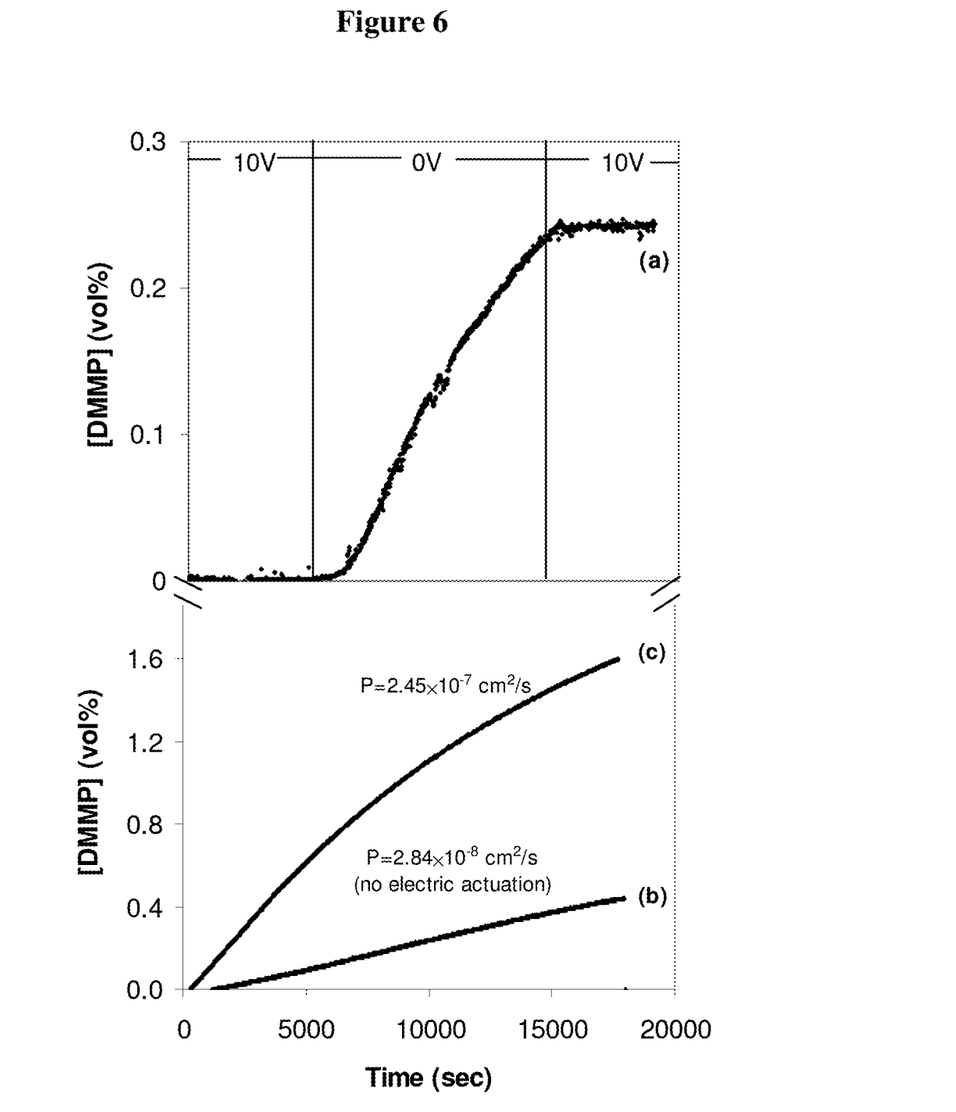
FIG. 6 shows the DMMP permeability of the PAMPS gel-g-PETE nanocomposite membrane with line (a) showing 15 weight percent PAMPS gel with actuation, line (b) showing 15 weight percent PAMPS gel without actuation, and line (c) showing the original, unfilled PETE membrane (50 nm pore diameter).

FIG. 6 shows the permeability of the nano-composite membranes with and without electric actuation. When an electric field (10 V) was applied, the membrane was nearly impermeable, but permeable when the electric field was removed (line (a)). The electric field was applied again after about 3 hours and the same electro-sensitive barrier properties were observed showing that this is a reversible process. Without applied voltage, the nanocomposite exhibited a permeability of $2.84 \times 10^{-8}$ cm$^2$/s (line (b)). This was similar to the permeability of the region where no voltage was applied in FIG. 6 and was also an order of magnitude lower than that of the original (unfilled) PETE membrane ($2.45 \times 10^{-7}$ cm$^2$/s (line (c)).

Figure 7:
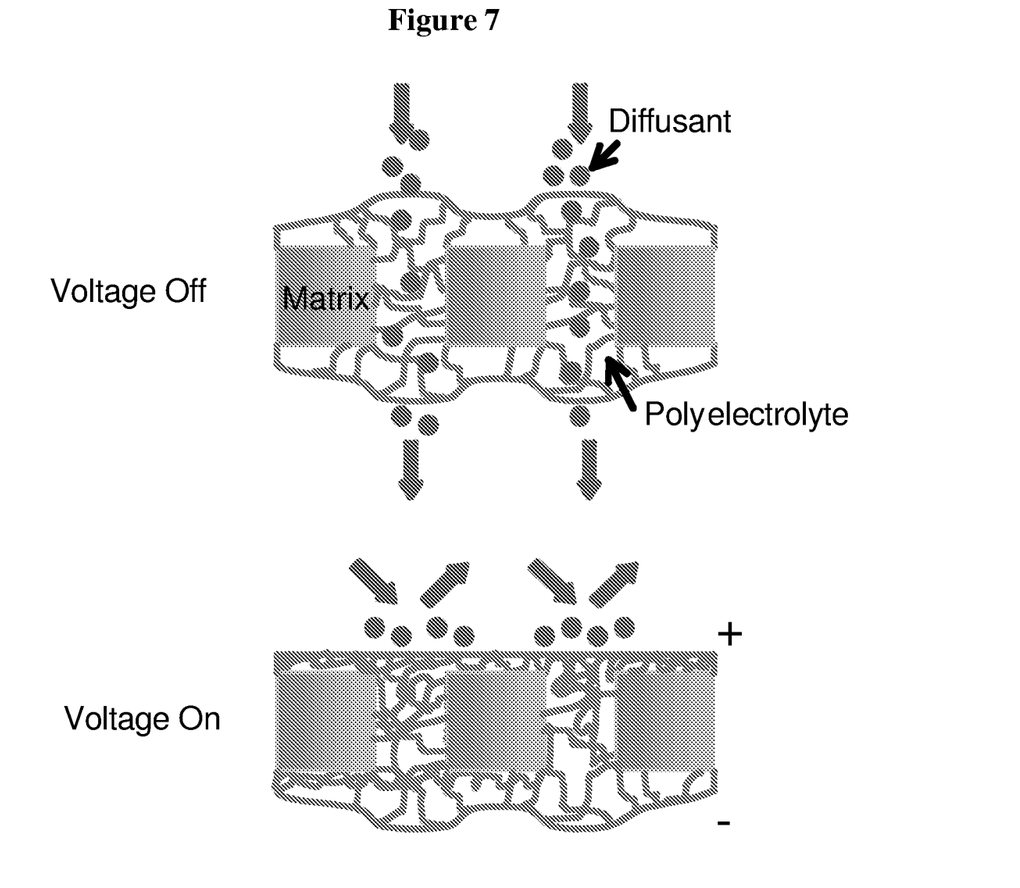
FIG. 7 shows a schematic of the effect of an electric filed on the network structure of the PAMPS gel in the nanocomposite.

The breakthrough time of about 13 minutes after the applied voltage was removed in line (a) was similar to the breakthrough time in line (b) where no voltage was applied. No actuation behavior was observed with the original PETE membrane. The theorized effect of the electric field on the network structure of the PAMPS gel in the nanocomposite is schematically shown in FIG. 7. Without voltage, the PAMPS gel in the pores swells with water and this swollen network allows for the diffusion of molecules. With voltage, the PAMPS gel on the surface and in the pores of the membrane asymmetrically contract (due to hydronium ion transport to the cathode), resulting in increased diffusion resistance.

Tensile tests show that the pure PAMPS gel membrane is more rigid and brittle than PETE matrix in the dry state (Table 3). The PAMPS gel lost strength after hydration. By grafting the PAMPS gel in the pores of the PETE matrix, the resulting composite showed similar breaking strength and elongation in both the dry and wet states, and an only slightly lower strength in the hydrated state than the PETE membrane alone.

TABLE 3

Mechanical Properties of PETE, PAMPS and PAMPS Gel-g-PETE Nanocomposite Membranes

| Sample | Breaking Strength (MPa) | Breaking Elongation (%) | Modulus (MPa) |
|---|---|---|---|
| Dry samples | | | |
| PETE | 87 ± 9 | 21 ± 3 | 762 ± 203 |
| PAMPS gel-g-PETE | 67 ± 19 | 16 ± 4 | 467 ± 120 |
| PAMPS gel [b] | 72 ± 15 | 3.2 ± 0.3 | 3108 ± 420 |
| Hydrated Samples | | | |
| PETE | 77 ± 9 | 19 ± 1 | 788 ± 77 |
| PAMPS gel-g-PETE | 21 ± 5 | 9.8 ± 0.4 | 121 ± 4 |
| PAMPS gel [c] | 0.012 | 40 | 0.03 |

Preliminary Transport Results

Figure 5:
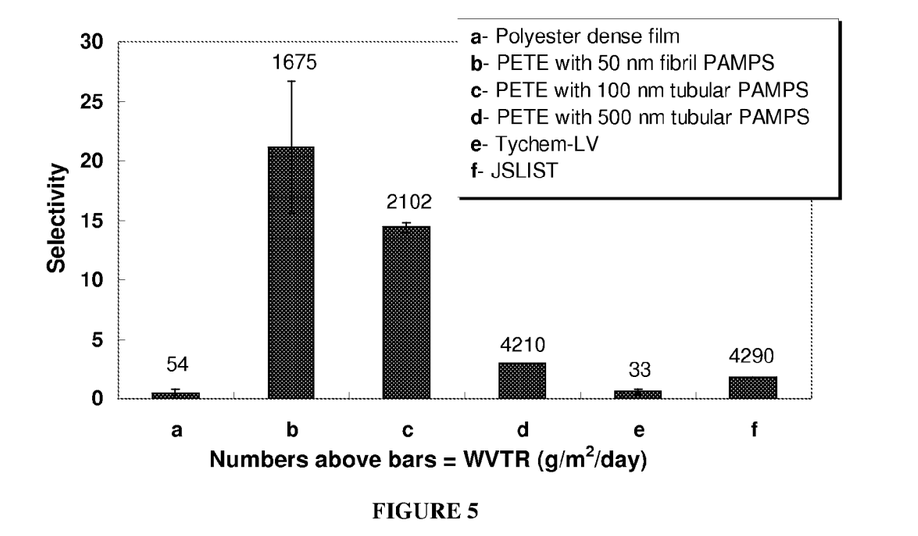
FIG. 5 shows the selectivity, expressed as a ratio of water vapor permeability to DMMP vapor permeability, of nanoporous PETE-g-PAMPS membranes of Example 3 compared with other membranes.

Preliminary sorption experiments show that polyester membranes have excellent barrier properties (e.g. are resistant to many organic solvents) and can be produced as flexible, durable films. In addition, ionic gels (e.g., PAMPS) dissolve in water, but has 0 wt % uptake in DMMP. FIG. 5 shows preliminary vapor transport results, where the selectivity is given as the ratio of water vapor permeability to DMMP vapor permeability, of nanoporous PETE-g-PAMPS membranes synthesized in this study are compared with several other membranes. The present membranes are about 10 times more selective than the JSLIST material which represents the current military standard used in chemical/biological protective clothing, with a similar water vapor transmission rate. Another key result: selectivity increases with decreasing pore size. Micron size pores mimic the current state of the art (JSLIST), while nanometer size pores result in a 10-fold improvement in selectivity.

Example 2

PCTE membranes were purchased from GEOsmonics and were used without further treatment. Track-etched membranes are prepared by bombarding a polymer membrane with heavy energetic ions followed by chemically etching tracks into pores. Several properties of the membranes used in this study are listed in Table 4, where porosity is defined as the void volume fraction. 2-Acrylamido-2-methyl-1-propanesulfonic acid (AMPS; 99%; Aldrich) and N,N-methylenebisacrylamide (BisA; ≧98%; Aldrich) were used as received. Ultrapure deionized, reverse osmosis water (resistivity 16 MΩ cm) was used.

TABLE 4

Properties of PCTE Membranes

| Sample | thickness (m) | pore size (nm) | porosity (%) |
|---|---|---|---|
| PCTE10 | 6 | 10 | 0.05 |
| PCTE50 | 6 | 50 | 1.18 |
| PCTE100 | 6 | 100 | 3.14 |
| PCTE400 | 10 | 400 | 12.56 |
| PCTE800 | 9 | 800 | 15.07 |
| PCTE2000 | 10 | 2000 | 6.28 |

Plasma Treatment.

The PCTE membranes were irradiated in a dielectric barrier discharge plasma configuration, consisting of two electrodes (19×19 cm$^2$) separated by 0.4 cm, at ambient conditions. The membranes were placed on the grounded lower electrode. Oxygen was introduced into the chamber at a flow rate of 1 L/min for 10 min. The samples were then exposed to plasma for 120 s at 1 W/cm$^2$. After the plasma treatment, the chamber was purged with oxygen for 2 min The membranes were then removed for the graft reaction.

Graft Polymerization.

The graft polymerization of AMPS onto plasma-treated track-etched membranes was performed in a round-bottom flask under a nitrogen atmosphere. Care was taken to keep the transfer time of the treated membranes from the plasma chamber to the grafting reaction flask less than 5 min. A calculated amount of AMPS was dissolved in deionized water in the flask to make 20 wt % monomer solution at a total weight of 20 g. The monomer solution was bubbled with nitrogen for 20 min before the addition of the PCTE membranes. Graft polymerization was initiated by elevating the temperature of the reaction mixture to 50° C. After 4 hours, PCTE membranes were removed from the reaction system and then thoroughly washed with deionized water. Graft polymerization with 2 wt % (of monomer) BisA cross-linker was conducted using the same procedure. The membranes were immersed in deionized water for 2 days after the reaction, and the excess gel surrounding the membranes was gently removed with tweezers.

Characterization of Grafting.

The grafting yield (G %; wt %) was calculated by (Wg−Wo)/Wo 100, where Wo and Wg are the dry weight of original and grafted membrane, respectively. For ATR-FTIR spectroscopy, the FTIR spectrometer (Nicolet™ 6700 Series) was equipped with a single-reflection diamond ATR attachment (Specac, Inc., MKII Golden Gate™) and was used to characterize the surface grafting. The diamond ATR has a 0.5 mm$^2$ sampling area, where a consistent reproducible pressure is applied to every sample. Infrared spectra were collected at 4 cm$^{-1}$ resolution and 32 scans. The morphology of the PCTE membranes, before and after grafting, was observed with scanning electron microscopy (SEM; model FEI/Phillips XL30™) at 10 kV. The membranes were fractured in liquid nitrogen for cross-section images. All samples were sputter coated (Denton Desk II Sputtering System) with platinum at 40 mA for 30 s before observation. EDS and sulfur KR maps were also collected on the cross-section of the grafted membranes using SEM coupled with an EDS microanalysis system. Membranes were uncoated in these experiments. Grafting yields are shown in Table 5.

TABLE 5

Grafting Yields of Composite Membranes With Cylindrical PAMPS Nanodomains

| Sample | G % (wt %) | wet thickness (m) | thickness change (%) |
|---|---|---|---|
| with tubular PAMPS domains | | | |
| PCTE10 | 2.5 | 6 | 0 |
| PCTE50 | 3.5 | 7 | 16 |
| PCTE100 | 10.2 | 11 | 83 |
| PCTE400 | 15.4 | 18 | 80 |
| PCTE800 | 4.9 | 13 | 45 |
| PCTE2000 | 0 | 11 | 10 |
| with fibril PAMPS domains | | | |
| PCTE10 | 2.1 | 19 | 217 |
| PCTE50 | 11.8 | 27 | 350 |
| PCTE100 | 18.5 | 30 | 400 |
| PCTE400 | 22.5 | 46 | 360 |
| PCTE800 | 30.1 | 44 | 389 |
| PCTE2000 | 10.0 | 33 | 230 |

Proton Conductivity.

Proton conductivity was measured using electrochemical impedance spectroscopy at frequencies between 100 Hz and 1 MHz on a Solartron™ AC Impedance system (1260 impedance analyzer, 1287 electrochemical interface, Zplot software). Measurements were taken at room temperature (23° C.) and normal to the plane of the membrane with a two-electrode cell comprised of 1.22 cm² stainless steel blocking electrodes. All membranes were prehydrated in deionized water for at least 24 hours and then quickly enclosed in a sealable cell to maintain hydration during impedance measurements. The real impedance was determined from the x intercept of the regression of the imaginary versus real impedance data over a high-frequency range (10 kHz to 1 MHz).

Tensile Tests.

Tensile tests of original PCTE and composite membranes were conducted on Instron™ 4200/4300/4400 at ambient conditions (23° C. and 50% relative humidity) with 2.54 mm/min crosshead speed. Samples were cut into 30 5 mm rectangular pieces, and a 10 mm gauge length was used. Tensile tests on hydrated (wet) samples were conducted by immersing the membrane strips in deionized water for 24 h and then removing and mounting quickly for tests. The sample transfer time was 1 min Three to five pieces of each sample were tested, and the values reported are the average of those repeated experiments.

Synthesis.

Oxygen plasma treatment functionalizes the polymer surface with oxygen-containing groups, such as hydroxyl, carbonyl, and hydroperoxide groups. The hydroperoxide groups are thermally labile in nature and upon heating initiate graft polymerization of AMPS, which introduces graft layers onto the surface. In addition, the oxygen-containing groups introduce hydrophilicity to the hydrophobic PCTE membrane. This facilitates the filling of pores with an aqueous reaction solution. Concentration of functional groups increases with exposure time to oxygen plasma. However, over-exposure to plasma may cause degradation to the polymer, which is evidenced by reduced mass or dimension of the material. The grafting results and micrographs reveal that 120 seconds oxygen plasma exposure used in this example introduces a sufficient amount of functional groups for surface grafting, while having no obvious impact on the mass or dimension of the original track-etched membrane.

Grafting yield from oxygen-plasma initiation was tunable by the polymerization conditions. Higher grafting yields (up to 10 wt %) were obtained at higher AMPS concentrations (40 wt %) and longer polymerization times (4 hours). Adding a small amount of bifunctional cross-linker (BisA, 2 wt % of monomer) enhanced the grafting yield significantly from below 10 wt % to above 20 wt %. In this example, PCTE membranes with pore sizes ranging from 10 to 2000 nm and porosities between 0.05 and 15% were grafted with PAMPS or PAMPS gel (2 wt % cross-linker) at 20 wt % AMPS and 50° C. for 4 hours. In both reactions, the grafting yield was nearly proportional to the porosity of the PCTE membrane, peaking at 15 wt % with linear PAMPS and 30 wt % with PAMPS gel grafts.

Higher grafting yields were obtained with the presence of a cross-linker, where grafting increases in both the pore and the top/bottom surface of the membrane occur (evidenced by larger wet thicknesses in fibril compared to tubular PAMPS, shown in Table 6).

TABLE 6

Proton Conductivity of Composite Membranes With Cylindrical PAMPS Nanodomains

| Sample | with tubular PAMPS domains | | |
|---|---|---|---|
| | resistance ($\Omega$) | effective conductivity (S/cm × $10^{-3}$) | specific conductivity (S/cm × $10^{-3}$) |
| PCTE10 | 234.8 | 0.09 | 127.9 |
| PCTE50 | 40.1 | 0.85 | 50.4 |
| PCTE100 | 7.2 | 1.68 | 29.1 |
| PCTE400 | 14.0 | 5.08 | 15.1 |
| PCTE800 | 116.5 | 1.89 | 5.5 |
| PCTE2000 | 285.0 | 0.47 | 4.1 |

| sample | with fibril PAMPS domains | | |
|---|---|---|---|
| | resistance ($\Omega$) | effective conductivity (S/cm × $10^{-3}$) | specific conductivity (S/cm × $10^{-3}$) |
| PCTE10 | 234.8 | 0.04 | 22.4 |
| PCTE50 | 40.1 | 2.12 | 43.5 |
| PCTE100 | 7.2 | 1.64 | 29.8 |
| PCTE400 | 14.0 | 8.21 | 13.3 |
| PCTE800 | 116.5 | 3.47 | 3.7 |
| PCTE2000 | 285.0 | 0.96 | 2.9 |

The hydrated composite membrane thickness increases with increasing pore size and porosity (increasing grafting yield), while the planar area of the membrane remains constant. This suggests that the PAMPS in the pores contributes to the change in thickness when hydrated. After grafting, the pores on the top surface of the membrane were partially closed, while a smoother layer was observed on the pore walls. This suggests grafting of PAMPS on the PCTE surface and pore walls (tubular PAMPS domains). Higher grafting yields obtained with the aid of BisA cross-linker resulted in the top surface completely covering the pores with a layer of PAMPS gel and the pores fully filled with PAMPS rods or fibrils. A broad range of domain sizes (50 and 2000 nm) can be filled by this grafting technique, where PAMPS nanodomains with aspect ratios as high as 240 were achieved in this work. Micrographs confirmed that, excluding the changes in surface morphologies, the bulk as well as the dimension of PCTE membranes is not altered by the grafting reaction, confirming that grafting is limited to the PCTE surface.

Figure 8:
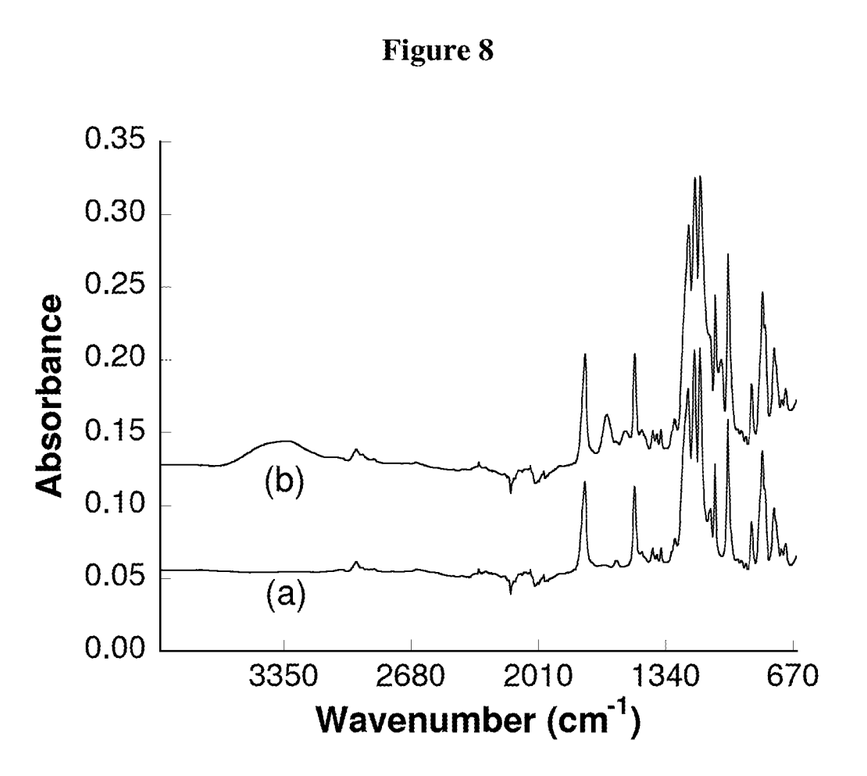
FIG. 8 is an ATR-FTIR spectra of PCTE800 (800 nm pore size) before (a) and after (b) being grafted with PAMPS fibrils which are cross-linked.
Figure 9A:
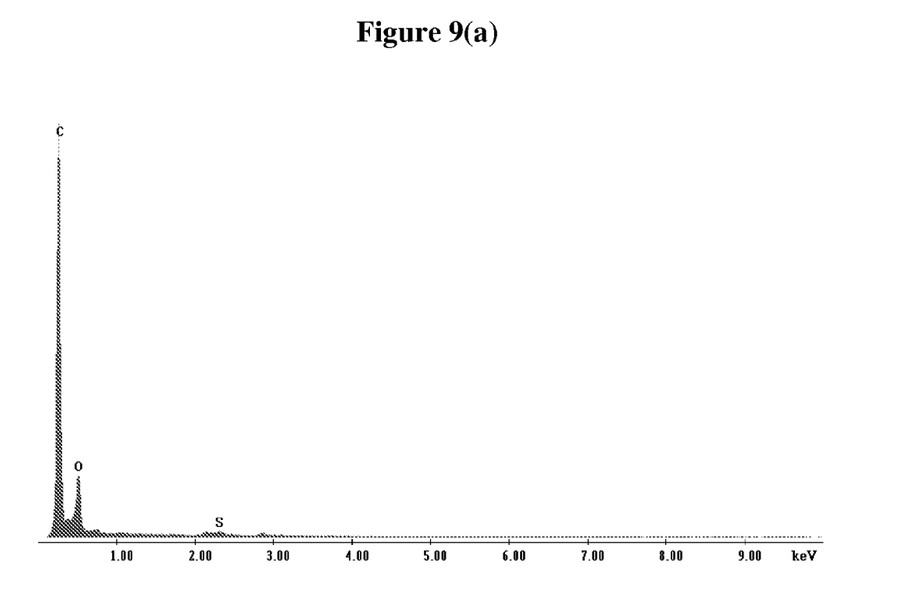
Figure 9B:
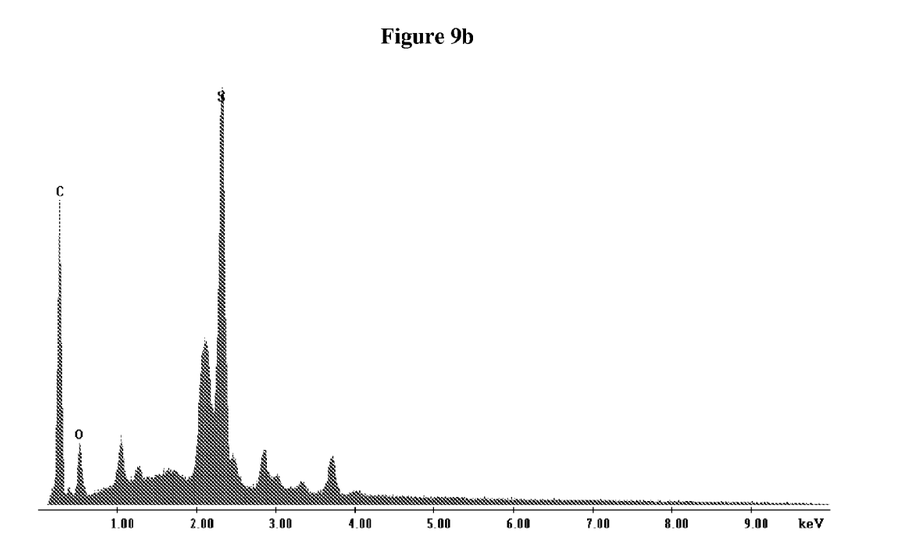

The surface grafting was further confirmed by ATR-FTIR with the appearance of new bands at 1055 cm$^{-1}$ and 1658 cm$^{-1}$ and a broad band between 3 150-3650 cm$^{-1}$ (FIG. 8), which represent SO3$^-$, CdO (Amide I), and NsH groups in PAMPS, respectively. Energy dispersive spectra (FIG. 9) of the cross-section of a grafted pore in the membrane confirm PAMPS on the pore walls by showing the signals of the KR shell of sulfur at 2.307 keV. To study the distribution of PAMPS on the pore walls, X-ray maps were collected on the cross-section of grafted membranes. While no sulfur was observed in the original PCTE membrane, clear patterns of sulfur across the cross-section were obtained in the grafted membranes. These patterns suggest that PAMPS was uniformly grafted on the pore walls. In addition, prior to imaging, all composite membranes were thoroughly washed and stored in deionized water after polymerization. Because PAMPS is water soluble, this confirms covalent bonds between the track-etched membrane and polyelectrolyte.

Proton Conductivity.

Proton conductivity of the composite membranes was measured normal to the plane of the membrane in a fully hydrated state (Table 6). Hydration increased the thickness of the composite membranes due to swelling of PAMPS grafted on the top/bottom surface of PCTE membranes. There was no change in the planar dimension of the hydrated composite membranes containing tubular PAMPS domains. The composite membranes with fibril PAMPS domains showed less than 10% expansion in the planar area after hydration. The robust PCTE matrix membrane provides dimensional stability for the polyelectrolyte. This may provide additional benefits to applications such as actuators and fuel cells.

The resistance of the original PCTE membranes was on the order of 10-100Ω. By incorporating tubular or fibril nanodomains of PAMPS, the resistance of composite membranes decreased significantly compared to the original PCTE membrane (Table 6). The highest conductivity obtained was 0.01 S/cm in the composite membrane containing 400 nm fibril PAMPS domains Overall, composite membranes with fibril PAMPS domains possess higher effective conductivities compared to the membranes with tubular PAMPS domains Micrographs show that the composite membranes with fibril PAMPS domains also have a thick layer of PAMPS gel grafts on the top/bottom surface of the membrane. This is further confirmed by the 200-400% increase in thickness after hydration, while the composite membranes with tubular PAMPS only showed 0-80% increase in thickness (Table 6). Apparently, in addition to the PAMPS nanodomains and the resistance of the matrix membrane, the layer of surface gel can also contribute to the overall or effective conductivity of the composite.

Specific Conductivity.

The specific conductivity of tubular PAMPS domains in the composites increased exponentially with decreasing domain size and exceeded the conductivity of isotropic PAMPS bulk gel at domain sizes less than 400 nm (Table 6). The highest value at 10 nm tubular domains was 6 times higher than the isotropic PAMPS gel. A similar exponential increase was observed for the specific conductivity of the fibril PAMPS domains (50-2000 nm), where the maximum value (at 50 nm domain size) was 2 times higher than the isotropic PAMPS gel (Table 2). A decrease in specific conductivity was observed with 10 nm fibril PAMPS domains, which may suggest that the pores are not fully filled with PAMPS fibrils. Notice that the PCTE membranes at 10 nm pore size grafted with tubular and fibril PAMPS have similar grafting yields, yet the fibril PAMPS composite membrane has a higher hydrated thickness compared to the tubular form (6 versus 19 m). This suggests that most of the fibril PAMPS is grafted to the top/bottom surface of the membrane and not in the pores.

Suitable materials of the Examples can be made into protective clothing using suitable techniques known to persons of ordinary skill in the art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. An article of clothing comprising a polymer membrane including an ionic polymer and a porous polymeric host membrane, wherein said ionic polymer and host membrane are associated with one another in a manner whereby a permeability of the polymer membrane can be altered by application of an electric field to the ionic polymer.

2. An article of clothing as claimed in claim 1, wherein the ionic polymer is a gel and the gel substantially fills the pores of the host membrane.

3. An article of clothing as claimed in claim 2, wherein the host membrane is hydrophobic and the ionic polymer is hydrophilic.

4. An article of clothing as claimed in claim 3, wherein the host membrane is a hydrophobic polymer-polymer nanocomposite.

5. An article of clothing as claimed in claim 4, wherein the host membrane comprises a material selected from the group consisting of: polyester track-etched membranes, polyamides, polysulfones, polyolefins, ionomers and fluoropolymers.

6. An article of clothing as claimed in claim 5, wherein the host membrane comprises a material selected from the group consisting of nylon, polyethylene, polyester, polyisobutylene, and polytetrafluoroethylene.

7. An article of clothing as claimed in claim 4, wherein the host membrane has a pore diameter of from 0.1 nm to 2000 nm.

8. An article of clothing as claimed in claim 4, wherein the host membrane has a pore diameter of from 1 nm to 200 nm.

9. An article of clothing as claimed in claim 4, wherein the host membrane has a pore diameter of from 1 nm to 100 nm.

10. An article of clothing as claimed in claim 8, wherein the ionic gel is water-permeable.

11. An article of clothing as claimed in claim 10, wherein the ionic gel comprises a material selected from the group consisting of: poly(2-acrylamido-2-methyl propane sulfonic acid), vinyl ester-co-poly(2-acrylamido-2-methyl propane sulfonic acid), diphenylmethane-4,4'-bismaleimide-co-poly (2-acrylamido-2-methyl propane sulfonic acid), poly(methylacrylic acid), poly(acrylic acid) and chitosan.

12. An article of clothing as claimed in claim 11, wherein the porous polymeric host membrane is a randomly oriented amorphous nanoporous membrane.

13. An article of clothing as claimed in claim 1, wherein the ionic polymer is covalently bound to the porous polymeric host membrane.

14. An article of clothing as claimed in claim 1, wherein the porosity of the polymeric host membrane is in a range of 0.01 to 25%.

15. An article of clothing as claimed in claim 1, wherein the porosity of the polymeric host membrane is in a range of 0.05 to 15%.

16. An article of clothing comprising an ionic polymer covalently bound to a porous polymeric host membrane,
   wherein the host membrane is a hydrophobic polymer-polymer nanocomposite having a pore diameter of from 1 nm to 200 nm and the ionic polymer is hydrophilic;
   wherein the ionic polymer is a hydrophilic, water-permeable gel that substantially fills the pores of the host membrane and the ionic polymer comprises a material selected from the group consisting of: poly(2-acrylamido-2-methyl propane sulfonic acid), vinyl ester-co-poly(2-acrylamido-2-methyl propane sulfonic acid), diphenylmethane-4,4'-bismaleimide-co-poly(2-acrylamido-2-methyl propane sulfonic acid), poly(methylacrylic acid), poly(acrylic acid) and chitosan; and
   wherein the porous polymeric host membrane is a track-etched polymer membrane.

17. A method for using an article of clothing as claimed in claim 1, comprising the step of:
   applying an electrical stimulus to the ionic polymer of said article of clothing to alter a permeability of said article of clothing.

18. A method as claimed in claim 16, further comprising a second step of applying an electrical stimulus to the ionic polymer of said article of clothing to at least partially reverse the permeability alteration of said article of clothing induced by said first step of applying an electrical stimulus.

19. A method as claimed in claim 16, wherein said electrical stimulus is an electric field.

20. A method as claimed in claim 16, wherein the step of applying an electrical stimulus to the ionic polymer of said article of clothing increases the permeability.

21. A method as claimed in claim 16, wherein the step of applying an electrical stimulus to the ionic polymer of said article of clothing decreases the permeability.

* * * * *